No. 614,387. Patented Nov. 15, 1898.
M. E. HARGIS.
WORK HOLDER.
(Application filed May 11, 1897.)
(No Model.)
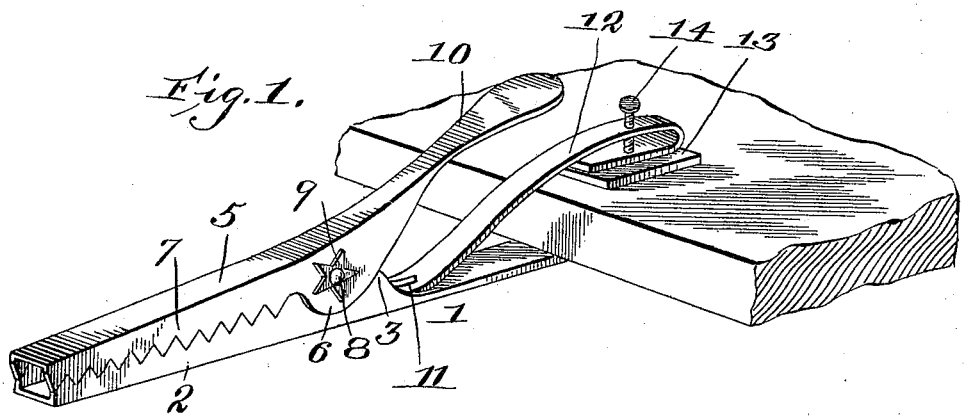
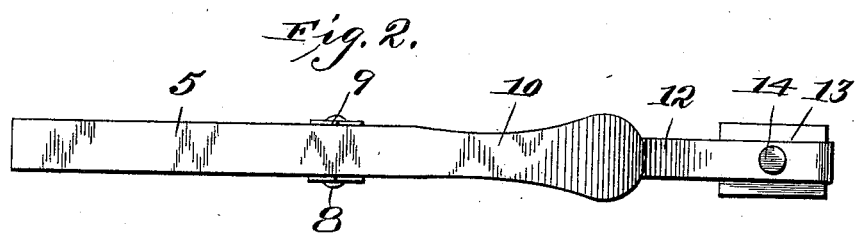
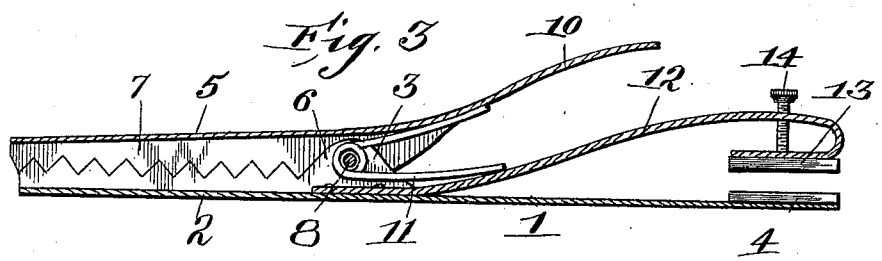
Witnesses
Wm H. Edwards Jr
Victor J. Evans
Inventor
Martha E. Hargis
By John Wedderburn, Attorney

UNITED STATES PATENT OFFICE.

MARTHA E. HARGIS, OF ATTICA, KANSAS.

WORK-HOLDER.

SPECIFICATION forming part of Letters Patent No. 614,387, dated November 15, 1898.

Application filed May 11, 1897. Serial No. 636,012. (No model.)

*To all whom it may concern:*

Be it known that I, MARTHA E. HARGIS, of Attica, in the county of Harper and State of Kansas, have invented certain new and useful Improvements in Work-Holders; and I do hereby declare the following to be a full, clear, and exact description of the invention, such as will enable others skilled in the art to which it appertains to make and use the same.

This invention has for its object to provide an implement that can be readily attached to a support, and presents spring-actuated clamping-jaws which are adapted to hold dress goods or other material while working upon the same.

The device is especially adapted for use by dressmakers, and will hold the goods firmly while sewing or otherwise working upon the same, the jaws being capable of a quick manipulation in taking hold.

In the following specification I have given some particular uses of which my invention is susceptible and have also entered into a detail description of the several parts which make up the implement, reference being had to the accompanying drawings, and to numerals thereon, and what I consider to be the essential features of the invention are specifically recited in the claims.

In the drawings forming part of this specification, Figure 1 is a perspective view showing my improved implement in position for use. Fig. 2 is a plan view of the implement. Fig. 3 is a longitudinal sectional view through the same.

Referring to the drawings by numerals, 1 designates the base-piece of the implement, the forward end 2 of which is shaped to present the stationary jaw, having serrations or teeth at its upper side edges to form a better grasping-surface, in connection with similar serrations or teeth on the pivoted jaw, hereinafter referred to. This base-piece is preferably made of sheet metal, the blank being of such configuration that when the edges are turned up they will present the lugs or ears 3 3 and the toothed grasping portions which form the stationary jaw of the device. The rear portion of this base piece or plate is flat, and upon the upper surface is secured a pad 4, of rubber, felt, or other suitable material, to form one of the contacting surfaces of the clamp which holds the implement in place.

5 designates the pivoted member of the device, which is also preferably constructed of sheet metal to present the depending ears 6 and side pieces 7, which are serrated and form the movable jaw, which is adapted to close upon the lower jaw. The ears 3 3 of the stationary member and the corresponding ears 6 6 of the pivoted member are pierced transversely to receive the pivot or bearing pin 8, the ends of which are upset upon star-shaped washers 9. It will be noted that the ears 6 of the pivoted member lie upon the outside of the ears 3 of the stationary member, and consequently the said pivoted member is of a slightly-greater width, by which arrangement the teeth 7 overlap the teeth 2. The pivoted member of the implement is extended in the rear of its pivot to form the operating end or handle 10 by which it is manipulated to open the jaws, the movable jaw being normally closed by means of a helical spring 11, which encircles the pivot-pin 8 and has its ends secured to the stationary and movable jaws, respectively.

In connection with the pad 4 of the stationary member forming one part of the clamp I provide a stiff spring-plate 12, the forward end of which is secured to the base-plate or stationary member of the implement, while the rear end portion is bent or looped, as shown, and secured to its under side is a pad 13. Upon the end of the metal plate 12 bears a set-screw 14, engaging a threaded aperture in the opposite portion of the plate, so as to force the pad 13 toward the pad 4. This forms a convenient arrangement by which the implement can be securely clamped to the support and held firmly thereby.

From the foregoing description, in connection with the accompanying drawings, the construction and operation of the implement will be readily apparent, for in attaching it to a support the pads are placed in engagement with the opposite sides thereof and the set-screw turned to clamp the upper pad in secure frictional engagement. The implement is then in position for use and by depressing the operating end or handle of the pivoted member the movable jaw will be opened, and when the goods or material is placed in position and pressure upon the pivoted member released the movable jaw will be automatically brought in position to firmly clamp or hold the goods.

This device can be effectively used by dressmakers, as it firmly holds the goods while being basted, ripped, or otherwise worked upon, and being capable of a quick manipulation it requires no loss of time in operating the same. The particular construction also provides for attaching the implement to any convenient place, as a sewing-machine support, table, or other support.

It will also be noted that by forming the members of the implement or clamp of sheet metal it provides for cheapness in manufacture and the exposed surfaces can be nickeled or otherwise ornamented to present a pleasing appearance.

Where the device is intended for holding light work, it is desired not to have the teeth pointed, but the edges are merely roughened or provided with a felt pad, so as to secure the proper hold when the jaws are brought together without running a risk of perforating or tearing the goods.

Having thus described my invention, what I claim as new, and desire to secure by Letters Patent, is—

1. An implement for the purpose set forth, comprising a stationary member having a jaw at its forward end and a pad attached to its rear end, a plate secured to the stationary member and having a looped end carrying a pad, a set-screw engaging a threaded aperture in the plate and bearing upon the part carrying the pad to force it toward the pad secured directly to the stationary member, together with a member pivoted to the stationary member having a jaw at one end and an operating-handle at its other end, said pivoted member being spring-actuated, substantially as shown and for the purpose set forth.

2. An implement for the purpose set forth, made up of sheet metal presenting a stationary member with upwardly-projecting ears and a jaw having upwardly-projecting side members presenting serrations or teeth, the other plate of metal having corresponding ears and projections or teeth, the parts being connected to each other by a pivot or bearing pin; together with a plate secured to the stationary member of the implement and carrying a set-screw and portion which is adapted to be forced toward the end of the stationary member, the jaw of the pivoted member being normally closed upon the jaw of the stationary member by means of a spring, substantially as shown and described.

In testimony whereof I have signed this specification in the presence of two subscribing witnesses.

MARTHA E. HARGIS.

Witnesses:
J. A. EDWARDS,
E. R. ROBINSON.